United States Patent
Luzzi et al.

(10) Patent No.: US 7,720,895 B2
(45) Date of Patent: May 18, 2010

(54) RANDOM NUMBER GENERATOR AND METHOD FOR GENERATING RANDOM NUMBERS

(75) Inventors: Raimondo Luzzi, Graz (AT); Marco Bucci, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1218 days.

(21) Appl. No.: 11/246,015

(22) Filed: Oct. 6, 2005

(65) Prior Publication Data
US 2006/0173943 A1    Aug. 3, 2006

(30) Foreign Application Priority Data
Jan. 28, 2005   (EP)   ................... 05001796

(51) Int. Cl.
   G06F 7/58   (2006.01)
(52) U.S. Cl. ..................................... 708/250
(58) Field of Classification Search ........... None
   See application file for complete search history.

(56) References Cited

U.S. PATENT DOCUMENTS

| | | | |
|---|---|---|---|
| 6,247,033 B1 | 6/2001 | Kowalski | |
| 6,408,317 B1 * | 6/2002 | Djakovic | ................... 708/250 |
| 2002/0186086 A1 | 12/2002 | Curiger et al. | |
| 2003/0037079 A1 * | 2/2003 | Wilber | ....................... 708/250 |
| 2003/0135527 A1 * | 7/2003 | Lundberg | .................... 708/250 |
| 2004/0107230 A1 | 6/2004 | Bardouillet | |
| 2005/0004959 A1 * | 1/2005 | Hars | .......................... 708/250 |
| 2007/0043797 A1 * | 2/2007 | Luzzi et al. | ................. 708/250 |

FOREIGN PATENT DOCUMENTS

WO    WO-03/090065 A2    10/2003

OTHER PUBLICATIONS

Craig S. Petrie, et al.; "Modeling and Simulation of Oscillator-Based Random Number Generators"; 1996 IEEE International Symposium on Circuits and Systems (ISCAS); Circuits and Systems Connecting the World, Atlanta, Georgia, May 12-15, 1996, vol. 1996, pp. 324-327.

* cited by examiner

*Primary Examiner*—David H Malzahn
(74) *Attorney, Agent, or Firm*—Dickstein, Shapiro, LLP.

(57) ABSTRACT

Random number generator including a first signal source outputting a first signal having a first frequency, a second signal source outputting a second signal having a second frequency which is lower than the first frequency, and time delay elements, wherein the output signals are delayed by a time interval with respect to the input signal. The output of one time delay element is connected in series to the input of another time delay element. The input of the first time delay element is connected to the output of the first signal source. The output of the first signal source and the output of each of the time delay elements are connected to the data input of a corresponding sample and hold element. Clock signal inputs of the sample and hold elements are each connected to the output of the second signal source. Outputs of the sample and hold elements provide random values.

37 Claims, 3 Drawing Sheets

RANDOM NUMBER GENERATOR AND METHOD FOR GENERATING RANDOM NUMBERS

CROSS-REFERENCE TO RELATED APPLICATION

This application claims priority to European Patent Application Ser. No. 05001796.1 filed on Jan. 28, 2005.

FIELD OF THE INVENTION

The present invention relates to random number generators and to methods for generating random numbers.

BACKGROUND OF THE INVENTION

Random numbers are required in many applications. An example is the use of random numbers in cryptographic tokens such as chip-cards. Both the symmetric and asymmetric ciphering algorithms require the availability of a high-quality random number source for key generation. Random numbers are also used for generating challenges in authentification protocols, to create padding bytes and blinding values in random masking.

Pseudo-random number generators based on cryptographic secure deterministic algorithms can be employed for creating random numbers for the above purposes. However, a physical source of true randomness is always needed for algorithm seeding. As a result, a cryptographic token must always feature a true random number generator among its peripheral devices. The most important feature of a high-quality random number generator is the unpredictability of the produced bit stream: an observer or attacker must not be able to carry out any useful prediction about the random number generator's output even if its design is known.

True random number generators produce random bit streams from non-deterministic stochastic processes such as electronic noise or radioactive decay. However, only electronic noise sources—such as thermal or shot noise—can be used in an integrated implementation. This is especially true for the use of random number generators in chip-cards, where low chip area and power consumption, as well as high production yield and low design costs are of high importance.

The implementations for generating random streams suitable for integrated environments reported in literature are based on three different techniques: direct amplification of a white noise source, jittered oscillator sampling, and time-discreet chaotic maps. Each type of random source, even if well designed, produces a bit stream that usually shows a certain level of correlation due to bandwidth limitation, fabrication tolerances, aging and temperature drifts, deterministic disturbances, etc. By designing a random number generator which is based on all three techniques, the advantages of each method can be exploited in order to improve the quality of the overall random number source.

A more effective solution for increasing the quality of the ransom bit stream is the post-processing of the raw bit stream from the source with carefully designed correcting and de-correlating algorithms. The post-processing can additionally feature compression so that a lower speed bit stream with increased statistical quality is generated from a high-speed near-random input stream by "distilling" its entropy.

Figure 1:
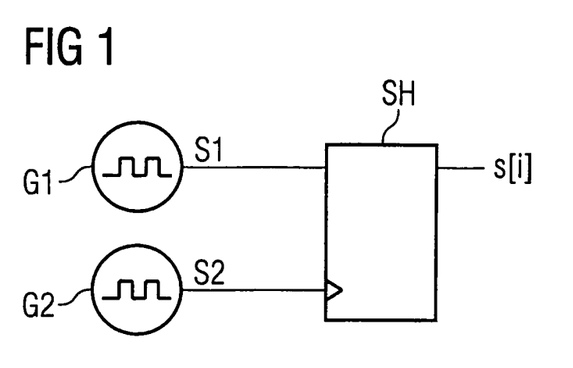
FIG. 1 shows a block diagram of a random number generator based on jittered oscillator sampling.

FIG. 1 shows a block diagram of a random number generator based on jittered oscillator sampling as known in the prior art. The random number generator basically consists of two free-running signal sources G1 and G2, and a sample and hold element SH. The output signal S1 of the first signal source G1 has a frequency f1 that is higher than the frequency f2 of the signal S2 output by the second signal source G2. The first signal S1 is used as a data input for the sample and hold element SH while the second signal S2 is used to trigger the sample and hold element. The outputs s[i] of the sample and hold element SH correspond to the values of the first signal S1 at the moments of sampling and are used as random values. The throughput of the random number generator is given by the frequency f2 of the second signal source G2.

Figure 2:
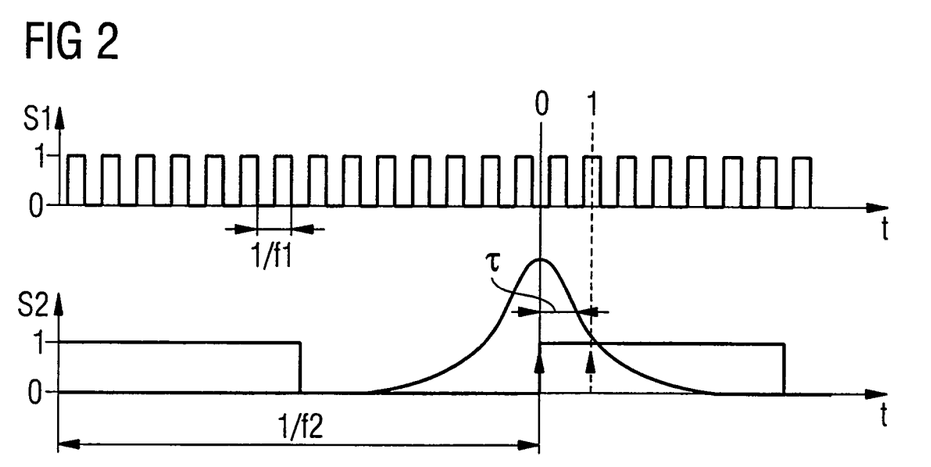
FIG. 2 shows the waveforms of the random number generator shown in FIG. 1.

The principle of jittered oscillator sampling is further illustrated by means of FIG. 2. Shown are the waveforms of the first signal S1 and the second signal S2 of the first and second oscillator G1 and G2, respectively. The first signal S1 is sampled with every rising edge of the second signal S2. Because of jitter, the period of the second signal S2 varies from cycle to cycle, so that the precise moment of the rising edge also varies with each cycle. The variations can be assumed to follow a Gaussian distribution with a standard deviation $\tau$. As a result of these variations, the first signal S1 is sometimes sampled at a low value "0" and sometimes at a high value "1". Because of the random distribution of the jitter, the sampled values are also randomly distributed and can be used for generating a random bit stream.

In FIG. 2, only the jitter of the second signal S2 is shown, while in reality, the first signal S1 also jitters. However, for the creation of randomness, only the relative variation of the frequencies between the first and second signals S1 and S2 is of interest, so that for the purpose of illustrating, jitter is assumed to be associated with the second signal S2 only.

For a correct functioning of the random number generator, it is important that the frequency f1 of the first signal S1 is not a integer multiple of the frequency f2 of the second signal S2, as otherwise beating may occur which leads to periodicity in the generated bit stream. Further, periodic disturbances such as the system clock, which can synchronize the second signal source G2 and thus dramatically reduce its jitter, must be minimized.

The entropy of the random values output by the random number generator is due to the jitter of the second signal source, the latter being the only source of randomness in the system. However, the jitter-to-mean-period ratio is usually quite small so that the distribution of the random values is not as uniform as desired. One way to overcome this problem is to increase the frequency f1 of the first signal S1 so that given a standard deviation $\tau$ of the jitter of the second signal S2, many periods of signal S1 will occur within a time interval of $+/-3\tau$. However, the frequency f1 of the first signal S1 cannot be increased indefinitely because of limits in implementing high-frequency oscillators. Another way to increase the random stream quality is to increase the jitter-to-mean-period ratio of the second signal S2 by means of an amplified noise source inside the second signal source G2. This approach however, results in an increase in chip area and power required for implementation.

SUMMARY OF THE INVENTION

Accordingly, it is an object of the invention to provide a random number generator and a method for generating random numbers with improved random stream quality having low chip area and low power requirements, together with high production yield and low design costs.

Accordingly, the invention provides a method for generating random numbers, comprising the steps of providing a first signal having a first frequency, providing a second signal having a second frequency, the second frequency being lower than the first frequency, delaying the first signal by integer multiples of a time delay to form at least one time-delayed signal, sampling and holding each of the first signal and the at least one time-delayed signal, where the sampling and holding is triggered by the second signal and the sampled and held values are provided as random values.

The invention also provides a first random number generator comprising a first signal source providing at its output a first signal having a first frequency, a second signal source providing at its output a second signal having a second frequency, where the second frequency is lower than the first frequency, at least one time delay element, each time delay element having an input and an output, the output signal being delayed by a time interval with respect to the input signal, where the output of one time delay element is connected in series to the input of another time delay element, the input of a first of the time delay elements is connected to the output of the first signal source, the output of the first signal source and the output of each of the at least one time delay elements are connected to the data input of a corresponding sample and hold element, the clock signal inputs of the sample and hold elements are each connected to the output of the second signal source and where the outputs of the sample and hold elements provide random values.

BRIEF DESCRIPTION OF THE DRAWINGS

The invention will now be described in more detail below by way of non-limiting examples and with reference to the accompanying drawings, in which.

DETAILED DESCRIPTION OF PREFERRED EMBODIMENTS OF THE INVENTION

The invention provides a first method for generating random numbers, comprising the steps of providing a first signal having a first frequency, providing a second signal having a second frequency, the second frequency being lower than the first frequency, delaying the first signal by integer multiples of a time delay to form at least one time-delayed signal, sampling and holding each of the first signal and the at least one time-delayed signal, where the sampling and holding is triggered by the second signal and the sampled and held values are provided as random values.

By time delaying the first signal N times by a given time delay to give N different time-delayed signals, it is possible to increase the time resolution of the jitter detection, just as if the frequency of the first signal had been increased by a factor of N. Instead of having to increase the jitter of the second signal, the first signal is time-delayed so that at least one of the first signal and the time-delayed signals is sampled at a different value than the rest of the signals. In this way it can be guaranteed that the jitter of the second signal can always be detected by changes in the values of at least one of the first signal and the time-delayed signals. As a result, the sampled and held values will always reflect the randomness inherent in the jitter of the second signal S2.

Further, a second method for generating random numbers is provided, comprising the steps of providing a first signal having a first frequency, providing a second signal having a second frequency, where the second frequency is lower than the first frequency, delaying the first signal by integer multiples of a first time delay, forming at least one first time-delayed signal, delaying the second signal by the same integer multiples of a second time delay, forming at least one second time-delayed signal, each second time-delayed signal corresponding to the first time-delayed signal delayed by the same integer multiple, sampling and holding the first signal, where the sampling and holding is triggered by the second signal, sampling and holding each of the at least one first time-delayed signals, where the sampling and holding is triggered by the corresponding second time-delayed signal and providing the sample and hold values as random values.

Compared to the first method, the time resolution of the jitter detection is further increased in the second method by delaying the sampling signals in the same way as the first signals are delayed, however with a different time delay. Every first time-delayed signal is sampled at a rate given by a corresponding second time-delayed signal.

Preferably, in the first and second method, the first signal is enabled and disabled during every cycle of the second signal. The enabling and disabling, which may be done by stopping and starting the first signal source, serves to prevent the first signal and the second signal from synchronizing with each other.

Preferably, in the first and second method, the sample and hold values are converted into a stream of random bits. The sample and hold values are collected and output at a given rate. In this way, the random values can be output more uniformly and post-processed more easily.

Preferably, in the first and second method, the stream of random bits is post-processed in order to improve the probability distribution, de-correlate the random bits and to compress the entropy of the stream of random bits, forming a post-processed stream of random bits. Post-processing is an effective way to increase the statistical quality of the bits in the random stream.

Preferably, in the first and second method, a value of the entropy of the stream of random bits is estimated by means of an entropy detection unit. The entropy estimated can be used to control the statistical quality of the bits in the random stream.

Preferably, in the first and second method, an alarm is raised if the estimated value of the entropy falls below a given value. By this feature, it is possible to stop the output of random numbers if a lack of entropy is detected. This might be the case if in an attack the random number generator was manipulated in order to cease producing high-quality random numbers.

Preferably, in the first and second method, a compression of the entropy of the stream of random bits during post-processing is adjusted depending on the estimated value of the entropy, so that the entropy per bit of the post-processed stream of random bits is constant. In this way, the rate of output of the random stream can be decreased in case that the entropy per bit of the non-post-processed random stream decreases in order to allow for more compression of the random bits, thus giving a higher entropy per bit.

There is further provided a first random number generator comprising a first signal source providing at its output a first signal having a first frequency, a second signal source providing at its output a second signal having a second frequency, where the second frequency is lower than the first frequency, at least one time delay element, each time delay element having an input and an output, the output signal being delayed by a time interval with respect to the input signal, where the output of one time delay element is connected in series to the input of another time delay element, the input of a first of the time delay elements is connected to the output of the first signal source, the output of the first signal source and the output of each of the at least one time delay elements are connected to the data input of a corresponding sample and hold element, the clock signal inputs of the sample and hold elements are each connected to the output of the second signal source and where the outputs of the sample and hold elements provide random values.

The first random number generator is useful for implementing the first method of generating random numbers.

There is further provided a second random number generator comprising a first signal source providing at its output a first signal having a first frequency, a second signal source providing at its output a second signal having a second frequency, where the second frequency is lower than the first frequency, at least one first time delay element, each first time delay element delaying the output signal by a first time interval with respect to the input signal, where the output of the first time delay element is connected in series to the input of another time delay element, the input of a first of the first time delay elements is connected to the output of the first signal source, at least one second time delay element, each second time delay element corresponding to a first time delay element, each second time delay element delaying the output signal by a second time interval with respect to the input signal, where the output of one second time delay element is connected in series to the input of another second time delay element, the input of a first of the second time delay elements is connected to the output of the second signal source, the output of the first signal source and the output of each of the at least one first time delay elements are connected to a data input of a corresponding sample and hold element, where the clock signal input of each sample and hold element is connected to the output of the second time delay element corresponding to the first time delay element, the clock input of a first sample and hold element is connected to the output of the second signal source and where the sampled signals of the sample and hold elements are used as random values.

The second random number generator is useful for implementing the second method of generating random numbers.

Preferably, in the first and the second random number generator, the first frequency is not an integer multiple of the second frequency. In this way, synchronization or beating of the first signal and the second signal can be minimized.

Preferably, in the first random number generator, the time delay of the time delay elements and in the second random number generator, the time delay of the first time delay elements are smaller than six times the standard deviation of the jitter of the second signal source. By choosing a suitably small time delay, the first signal is shifted in time with a resolution fine enough so that the jitter of the second signal source can be easily detected.

Preferably, in the first random number generator, the number N of time delay elements is equal to the integral part of half of the inverse of the product of the first frequency and the time delay. The number N of time delay elements is chosen so that the maximum time shift of the first signal, which is given by N times the number of the time delay, with respect to the non-shifted first signal, is just greater than half a period of the first signal. In this way, it can be guaranteed that at least one of the first signal and the time shifted signals will be sampled at a low value while the other signals are sampled at a high value.

Preferably, in the second random number generator, the number N of first time delay elements is equal to the number N of second time delay elements and is equal to the integral part of half of the inverse of the product of the first frequency and the difference of the second time delay and the first time delay.

Preferably, in the first and the second random number generator, the time delay element and the first and/or the second time delay elements, comprises at least one inverter. Inverters usually possess the shortest time delay of any digital gate available in standard cell libraries so that the time resolution of the jitter will be maximized by the use of inverters. Two inverters may be connected in series so that the time-shifted signal will not be inverted. More Inverters may be connected in series to increase the time delay as desired.

Preferably, in the first and the second random number generator, the first signal source is a ring oscillator comprising at least one of the time delay elements or at least one of the first time delay elements, respectively. For the second random number generator, it is also possible to construct the second signal source by using at least some of the second time delay elements. In this way, the time delay elements are not only used for delaying the first signals but are also used for the first signal source. Such designs allow for random number generators which are extremely compact, robust and easy to design with respect to designs where a significant analog part is present.

Preferably, in the first and the second random number generator, the sample and hold elements each comprise edge-triggered D-flip flops. Edge-triggered D-flip flops are available as standard cells in digital libraries, simplifying the design.

Preferably, in the first and the second random number generator, the output of the sample and hold elements are connected to a converter to provide a stream of random bits. The converter may be a parallel-to-serial converter or a decoder. Instead of outputting a word of random bits every cycle of the first signal, the random bits are output serially at a higher rate and can be immediately post-processed or used as random values.

Preferably, in the first and the second random number generator, the stream of random bits is connected to the input of a post-processing unit. The post-processing unit is used to correct the statistical distribution of the bits in the random stream and de-correlates bits while at the same time being able to compress the random bit stream as well. In this way, a lower speed bit stream with increased statistical quality can be generated from a high-speed near random input stream.

Preferably, in the first and the second random number generator, the stream of random bits is further connected to the input of an entropy detection unit. By means of the entropy detection unit, the entropy of the stream of random bits is estimated and output, so that the statistical quality of the random streams can be observed and any necessary actions, such as raising an alarm, taken.

Preferably, in the first and the second random number generator, the post-processing unit has an input for inputting a compression factor to which the output of the entropy detection unit is connected. The amount of compression in the post-processing unit is controlled by the compression factor, the compression factor being a measure for the entropy per bit of the output stream. By estimating the entropy of the raw random stream and feeding back a higher compression factor into the post-processing unit when a lower entropy is detected, the quality in terms of entropy per bit of the post-processed random stream can be kept constant.

Figure 3:
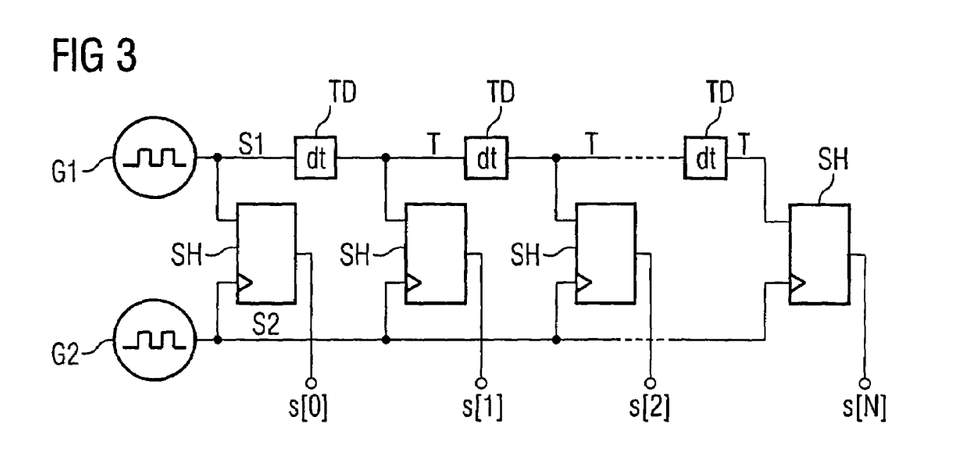
FIG. 3 shows a block diagram of a first random number generator according to the invention.

Reference is now made to FIG. 3, which shows a block diagram of a first random number generator according to the invention. A first signal source G1 produces a first signal S1 with a first frequency f1. The first signal S1 is delayed in time by a plurality of time delay elements TD, each having a time delay of dt, to produce time-delayed signals T. The first signal S1 and the time-delayed signals T are each connected to the data inputs of sample and hold elements SH. There is one more sample and hold element SH than there are time delay elements TD. The clock input of the sample and hold elements SH are connected to a second signal S2, which is output by a second signal source G2 and has the frequency f2. The outputs s[i] of the sample and hold elements SH represent the values of the first signal S1 and the time-delayed signals T at the moment of sampling which is given by the second signal S2. The output s[i] are then used as random values.

The frequencies f1, f2 of the first and second signal S1, S2 are chosen so that f2 is smaller than f1 and f1 is not an integer multiple of f2. In this way, the second signal S2 can be used to sample the first signal S1 without risking synchronization or beating of the two signals S1, S2. For the purpose of illustration, it is assumed that the source of randomness lies in the cycle-to-cycle variations of the period, commonly known as jitter, of the second signal S2 only and that the first signal S1 shows no jitter. In reality, both signals S1 and S2 will show jitter.

Figure 4:
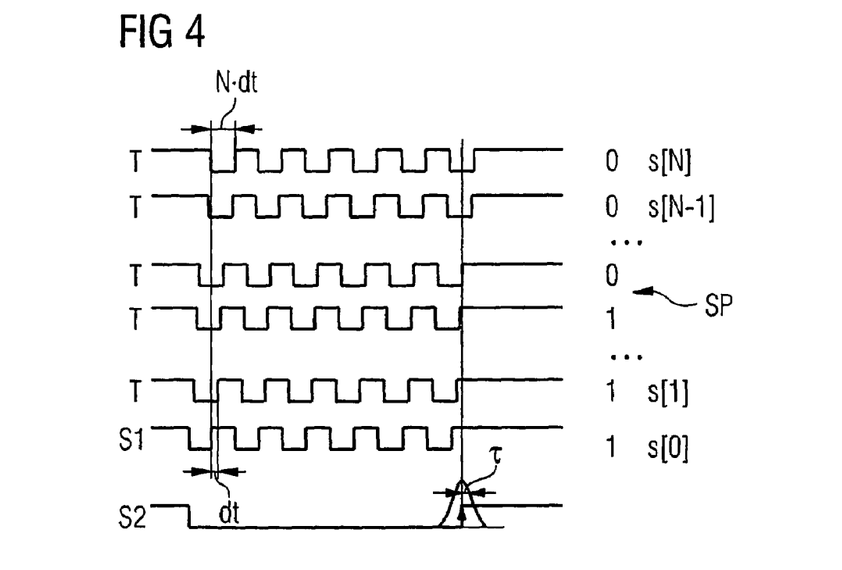
FIG. 4 shows waveforms of a first random number generator according to the invention.

The waveforms of the first signal S1, the second signal S2 and of the time-delayed signals T of the random number generator shown in FIG. 3 are illustrated in FIG. 4. As can be seen, the first signal S1 is successively shifted by each of the time delay elements TD by a time delay of dt until a total time delay of N*dt of the topmost waveform is achieved, N being the number of time delay elements TD. The rising edge of the second signal S2 determines the sampling points of the first signal S1 and the time-delayed signals T. The values sampled are shown on the right-hand side of FIG. 4, starting with a value of "1" of the first signal S1 and continuing with "1"s until a switching point SP is reached. Moving upwards in the waveforms, the output changes to a "0" and remains at this value for the remaining time delay signals T. Each sampled value corresponds to an output s[i] of a sample and hold elements SH shown in FIG. 3 and is used as a random value.

The number N of time delay elements TD, their time delay dt and the frequency f1 of the first signal S1 are chosen so that after N time delays the last delayed signal T is delayed by just more than half a period of the first signal S1 with respect to the first signal S1. In this way, it can be guaranteed that when sampling the first signal S1 and the N time-delayed signals T that there will be at least one change in the values of the sampled signals, such as a switch from a high "1" to a low value "0". It is assumed that the first signal S1 and the time-delayed signals T possess duty cycles of 0.5, so that a sign reversal occurs after half a period of signal S1. If the first signal S1 is shifted by more than half its period, the random values will start repeating themselves without adding any new entropy. By choosing N, dt and f1 as described above, there will only be one switching point SP.

If the second signal S2 in FIG. 4 shows no jitter at all, the switching point SP will always remain at the same position. However, in reality there will always be some jitter. Assuming that this jitter causes the rising edge of the second signal S2 to occur earlier, that is to move to the left to the diagram, then there will be less "1"s and more "0"s and the switching point SP will move to a lower position.

Assuming that the jitter of the second signal S2 is Gaussian distributed with a standard deviation of $\tau$, 99% of all possible deviations will lie within +/−3 $\tau$ of the mean of the period 1/f2. It follows that, if one is to be able to detect the variation in jitter, the time delay dt must be smaller than 6*$\tau$. Only in this case will the jitter lead to a possible change in the sampled values of all the time-delayed signals T and the first signal S1. If this condition is not fulfilled, then the switching point SP will not be able to move to all possible positions, rather it will remain in a subset of possible positions only. The time delay dt can thus be interpreted to define the time resolution available for detecting the jitter of the second signal S2. For a given standard deviation $\tau$ of the jitter of the second signal S2, a corresponding time delay dt which fulfills the above condition has to be chosen. In case the time delay dt cannot be sufficiently decreased because of limitations in the time delay elements TD, the standard deviation $\tau$ of the jitter of the second signal S2 has to be increased.

Figure 5:
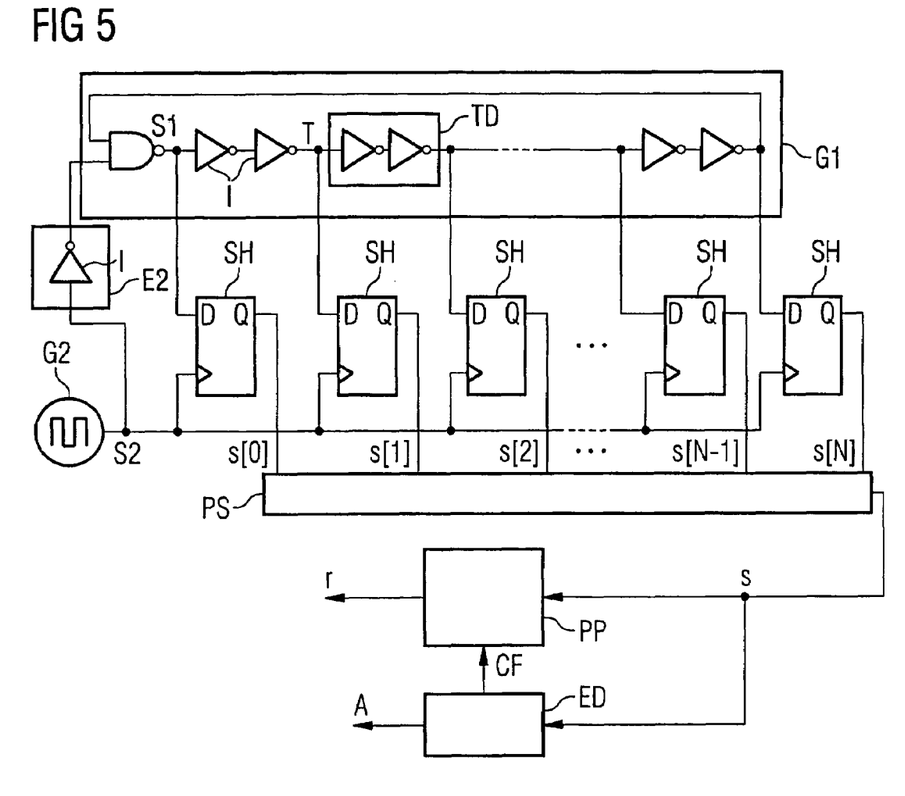
FIG. 5 shows an embodiment of the first random number generator according to the invention.

An embodiment of the first random number generator is shown in FIG. 5. Each time delay element TD is composed of two inverters I which are connected in series. The time resolution dt, with which the time-delayed signals T can be sampled, is thus determined by the propagation delay of the fastest inverter in the technology in which the random number generator is implemented. In principle, only one inverter I is needed to provide the necessary time delay dt. However, by using two inverters I to form each time delay element TD, the time-delayed signals T will not be inverted and the switching point SP can be easier to detect, leading to a simpler implementation of the converter PS which is described later.

The first signal source G1 is implemented as a ring oscillator using the time delay elements TD connected in series and a NAND gate. The output of the last time delay element TD is fed back into the NAND gate and the nodes after each time delay element are used to provide the time-delayed signals T. By using the time delay elements TD simultaneously for delaying the first signal S1 and for implementing the first signal source G1, an extremely compact random number generator can be created. Depending on the required time delay dt, more than two inverters I may need to be used for each time delay element TD and depending on the desired frequency f1 of the first signal S1, only a portion or more than the N time delay elements TD in the random number generator may need to be used.

An enabling unit E2, which may consist of just one inverter I, is connected to the second signal S2 and the input of the NAND gate. For every low half-cycle of the signal S2, the output of the inverter I will be high and the NAND gate will act as an inverter. In order to create an oscillation, the first signal S1 has to be inverted an odd number of times in the ring oscillator. Since the time delay elements TD consist of two inverters I each, the NAND gate provides the additionally needed inverter for oscillation. As a result, the first signal source G1 operates normally and random numbers are produced during the low half-cycle of the second signal S2. During every high half-cycle of the second signal S2, the output of the inverter I in the enabling unit E2 is low so that the output of the NAND gate always remains at a high level. As a result, no oscillating first signal S1 is produced. The purpose of the enabling unit E2 is to stop the first signal source G1 for every half-cycle of the second signal S2 in order to prevent synchronization or beating of the first and second signal S1 and S2.

The sample and hold elements SH shown in FIG. 5 are implemented as D-flip flops, resulting in a very simple construction. The whole random number generator can be implemented using just digital gates available in any standard-cell library and no analog circuits need to be employed. The proposed random number generator thus features a substantial advantage in terms of a shorter design term, higher yield, higher portability on different fabrication technologies, and higher robustness with respect to other designs. Moreover, the embodiment is extremely compact and low chip area demanding and therefore very suitable for use in chip-cards.

The purpose of the converter PS is to take the outputs s[i] of the sample and hold elements SH, which present the values of the first signal S1 and the time-delayed signals T sampled at every rising edge of the second signal S2 and to convert these individual random bits into a random bit stream s. The converter PS essentially is a parallel-to-serial converter, such as a shift-register. The converter PS may also be a decoder which can be used to determine a position of the switching point SP, for example by the use of XOR elements.

The random stream s is post-processed by means of a post-processing unit PP in order to correct or de-correlate random bits in the random bit stream s. The post-processing unit PP can also be used to compress or extract entropy of the high-speed random stream s by distilling its entropy to produce a lower speed bit stream r with increased statistical quality. The post-processing unit PP may comprise a linear feedback shift register and may have an input CF for inputting a compression factor. The compression factor determines the amount of compression of the random stream s.

A very important advantage of the proposed random number generators is that a deterministic model of the random number generator, that is its behavior in absence of any noise contribution, is clearly identified and easy to recognize. Using this model, the amount of generated entropy of the random stream s can be easily estimated in an entropy detection unit ED. Should the entropy detection unit ED detect a lack of entropy, an alarm A can be output, indicating the poor statistical quality of the produced random stream. In this way, attacks on the random number generator which try to reduce the randomness of its output can be readily recognized.

Further, the entropy detection unit ED can be used to output a signal which is then used to adjust the compression factor used in the post-processing unit PP. In this way, the quality of the random numbers in terms of entropy per bit can be kept constant by decreasing the speed of the stream if the entropy per bit of the stream s decreases. The availability of both defined deterministic and stochastic models of the random number generator and the possibility to easily detect a lack of entropy are key features that also simplify the certification procedure for applications in security devices like chip-cards.

Figure 6:
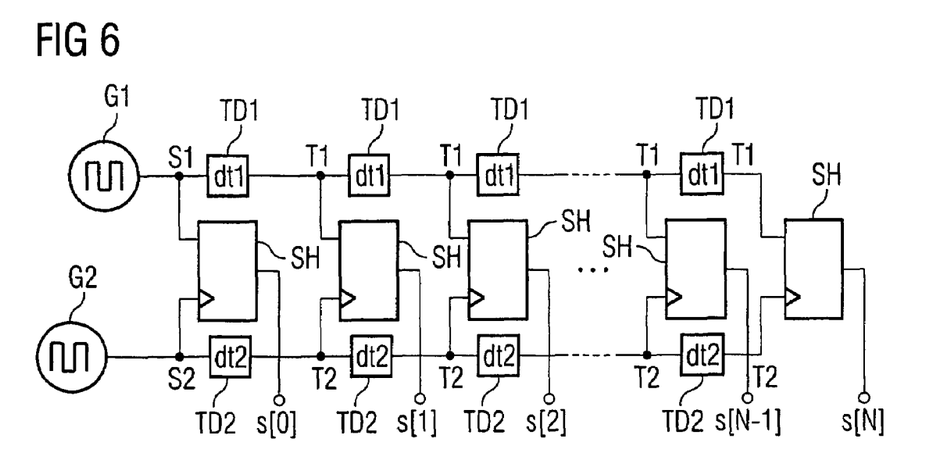
FIG. 6 shows a block diagram of a second random number generator according to the invention.

The time resolution of the jitter of the second signal S2 is limited by the shortest delay dt of the time delay elements TD that is possible in a given technology. FIG. 6 illustrates a second random number generator and a second method for generating random numbers, in which time resolution is improved. The block diagram of the second random number generator is similar to the block diagram shown in FIG. 3. Again, a first signal source G1 produces a first signal S1 which is successively delayed in time by a first time interval dt1 by means of first time delay elements TD1 to produce first time-delayed signals T1. The first signal S1 and the first time-delayed signals T1 are each used as data inputs to a corresponding sample and hold element SH. Again, a second signal source G2 is provided, which outputs a second signal S2 having a second frequency f2.

In contrast to the first random number generator shown in FIG. 3, where all the clock inputs of the sample and hold elements SH are triggered by the second signal S2, only a first sample and hold element SH is triggered by the second signal S2 in FIG. 6. The remaining sample and hold elements are triggered by second time-delayed signals T2 which are formed by successively delaying the second signal S2 by integer multiples of a second time delay dt2 in second time delaying elements TD2. Each second time delay element TD2 is used to create a second time-delayed signal T2 which is used to trigger a sample and hold element SH having as data input the first time-delayed signal T1 of a corresponding first time delay element TD1. The number N of first time delay elements TD1 and second time delay elements TD2 are equal, the number of sample and hold elements SH is one more than the number N of first and second time delay elements TD1, TD2.

Again, the time delay dt1 of the first time delay elements TD1 are chosen so that the maximum time delay N*dt1 is just greater than half a period of the first signal S1. Similarly, the time delay dt2 of the second time delay elements TD2 are chosen so that the maximum time delay N*dt2 is equal to half a period of the second signal S2. As a result, the second time delay dt2 is greater than dt1 and the time resolution for the jitter is increased from dt1 to (dt2−dt1). To guarantee correct operation, the number N of first and second time delay elements TD1, TD2 must be equal to the integral part of one half of the period of the first signal S1 divided by the time resolution (dt2−dt1).

The block diagram shown in FIG. 6 may be implemented using any of the elements described together with FIG. 5. The block diagram in FIG. 6 may be further expanded by adding an enabling unit E2, a converter PS, a post-processing unit PP, and an entropy detection unit ED as described above. Since signal S2 is delayed by second time delay elements TD2, the second signal source G2 may also be implemented as a ring oscillator. Obviously, variations and combinations in the implementation are possible.

What is claimed is:

1. A method for generating random numbers, comprising:
providing a first signal having a first frequency;
providing a second signal having a second frequency, wherein the second frequency is lower than the first frequency;
delaying the first signal by integer multiples of a time delay, forming at least one time-delayed signal;
sampling and holding each of the first signal and the at least one time-delayed signal, wherein the sampling and holding is triggered by the second signal; and
providing the sampled and held values as random values
wherein the first signal is enabled and disabled during every cycle of the second signal.

2. The method according to claim 1, wherein the sampled and held values are converted into a stream of random bits.

3. A method for generating random numbers, comprising:
providing a first signal having a first frequency;
providing a second signal having a second frequency, wherein the second frequency is lower than the first frequency;
delaying the first signal by integer multiples of a time delay, forming at least one time-delayed signal;
sampling and holding each of the first signal and the at least one time-delayed signal, wherein the sampling and holding is triggered by the second signal; and
providing the sampled and held values as random values,
wherein the sampled and held values are converted into a stream of random bits, and the stream of random bits is post-processed in order to improve the probability distribution, de-correlate the random bits, and to compress the entropy of the stream of random bits, forming a post-processed stream of random bits.

4. The method according to claim 3, wherein a value of the entropy of the stream of random bits is estimated in an entropy detection unit.

5. The method according to claim 4, wherein an alarm is raised if the estimated value of the entropy falls below a given value.

6. The method according to claim 4, wherein the compression of the entropy of the stream of random bits during post-processing is adjusted depending on the estimated value of the entropy, so that the entropy per bit of the post-processed stream of random bits is kept constant.

7. A method for generating random numbers, comprising:
providing a first signal having a first frequency;
providing a second signal having a second frequency, wherein the second frequency is lower than the first frequency;
delaying the first signal by integer multiples of a first time delay, forming at least one first time-delayed signal;
delaying the second signal by the same integer multiples of a second time delay, forming at least one second time-delayed signal, each second time-delayed signal corresponding to the first time-delayed signal delayed by the same integer multiple;
sampling and holding the first signal wherein the sampling and holding is triggered by the second signal;
sampling and holding each of the at least one first time-delayed signals, wherein the sampling and holding is triggered by the corresponding second time-delayed signal; and providing the sampled and held values as random values.

8. The method according to claim 7, wherein the first signal is enabled and disabled during every cycle of the second signal.

9. The method according to claim 7, wherein the sampled and held values are converted into a stream of random bits.

10. The method according to claim 9, wherein the stream of random bits is post-processed in order to improve the probability distribution, de-correlate the random bits and to compress the entropy of the stream of random bits, forming a post-processed stream of random bits.

11. The method according to claim 10, wherein a value of the entropy of the stream of random bits is estimated in an entropy detection unit.

12. The method according to claim 11, wherein an alarm is raised if the estimated value of the entropy falls below a given value.

13. The method according to claim 11, wherein the compression of the entropy of the stream of random bits during post-processing is adjusted depending on the estimated value of the entropy, so that the entropy per bit of the post-processed stream of random bits is kept constant.

14. A random number generator comprising:
a first signal source configured to provide at its output a first signal having a first frequency;
a second signal source configured to provide at its output a second signal having a second frequency, wherein the second frequency is lower than the first frequency; and
at least one time delay element, each time delay element having an input and an output, the output signal being delayed by a time interval with respect to the input signal,
wherein the output of one time delay element is connected in series to the input of another time delay element, the input of a first of the time delay elements is connected to the output of the first signal source, the output of the first signal source and the output of each of the at least one time delay elements are connected to the data input of a corresponding sample and hold element, the clock signal inputs of the sample and hold elements are each connected to the output of the second signal source, and the outputs of the sample and hold elements provide random values.

15. The random number generator according to claim 14, wherein the first frequency is not an integer multiple of the second frequency.

16. The random number generator according to claim 15, wherein the time delay of the time delay elements is smaller than six times the standard deviation of the jitter of the second signal source.

17. The random number generator according to claim 14, wherein the number N of time delay elements is equal to the integral part of half of the inverse of the product of the first frequency and the time delay.

18. The random number generator according to claim 14, wherein each time delay element comprises at least one inverter.

19. The random number generator according to claim 14, wherein the first signal source is a ring oscillator comprising at least one of the time delay elements.

20. The random number generator according to claim 14, wherein the sample and hold elements each comprise edge-triggered D flip-flops.

21. The random number generator according to claim 14, wherein the outputs of the sample and hold elements are connected to a converter to provide a stream of random bits.

22. The random number generator according to claim 21, wherein the stream of random bits is connected to an input of a post-processing unit.

23. The random number generator according to claim 22, wherein the stream of random bits is connected to an input of an entropy detection unit.

24. The random number generator according to claim 23, wherein the post-processing unit has an input for inputting a compression factor, and
wherein the output of the entropy detection unit is connected to a compression factor input of the post-processing unit.

25. A random number generator comprising:
a first signal source configured to provide at its output a first signal having a first frequency;
a second signal source configured to provide at its output a second signal having a second frequency, wherein the second frequency is lower than the first frequency; and
at least one first time delay element, each first time delay element configured to delay the output signal by a first time interval with respect to the input signal,
wherein the output of one first time delay element is connected in series to the input of another time delay element, the input of a first of the first time delay elements is connected to the output of the first signal source, and the output of the first signal source and the output of each of the at least one first time delay elements are connected to a data input of a corresponding sample and hold element;
at least one second time delay element, each second time delay element corresponding to a first time delay element and delaying the output signal by a second time interval with respect to the input signal,
wherein the output of one second time delay element is connected in series to the input of another second time delay element, the input of a first of the second time delay elements is connected to the output of the second signal source, and the clock signal input of each sample and hold element is connected to the output of the second time delay element corresponding to the first time delay element, wherein the clock input of a first sample and hold element is connected to the output of the second signal source, and wherein the sampled signals of the sample and hold elements are used as random values.

26. The random number generator according to claim 25, wherein the first frequency is not an integer multiple of the second frequency.

27. The random number generator according to claim 25, wherein the first time delay is smaller than six times the standard deviation of the jitter of the second signal source.

28. The random number generator according to claim 25, wherein the number N of first time delay elements and the number N of second time delay elements is equal to the integral part of half of the inverse of the product of the first frequency and the difference of the second time delay and the first time delay.

29. The random number generator according to claim 25, wherein the first and/or the second time delay elements each comprise at least one inverter.

30. The random number generator according to claim 25, wherein the first signal source is a ring oscillator comprising at least one of the first time delay elements.

31. The random number generator according to claim 25, wherein the sample and hold elements each comprise edge-triggered D flip-flops.

32. The random number generator according to claim 25, wherein the outputs of the sample and hold elements are connected to a converter to provide a stream of random bits.

33. The random number generator according to claim 32, wherein the stream of random bits is connected to the input of a post-processing unit.

34. The random number generator according to claim 32, wherein the stream of random bits is connected to the input of an entropy detection unit.

35. The random number generator according to claim 34, wherein the post-processing unit has an input for inputting a compression factor, and wherein the output of the entropy detection unit is connected to the compression factor input of the post-processing unit.

36. A system for generating random numbers, comprising:
means for providing a first signal having a first frequency;
means for providing a second signal having a second frequency, wherein the second frequency is lower than the first frequency;
means for delaying the first signal by integer multiples of a time delay, forming at least one time-delayed signal;
means for sampling and holding each of the first signal and the at least one time-delayed signal, wherein the sampling and holding is triggered by the second signal; and
means for providing the sampled and held values as random values,
wherein the first signal is enabled and disabled during every cycle of the second signal.

37. A random number generator comprising:
a first signal source means for providing at its output a first signal having a first frequency;
a second signal source means for providing at its output a second signal having a second frequency, wherein the second frequency is lower than the first frequency; and
at least one time delay means, each time delay means having an input and an output, the output signal being delayed by a time interval with respect to the input signal,
wherein the output of one time delay means is connected in series to the input of another time delay means, the input of a first of the time delay means is connected to the output of the first signal source means, the output of the first signal source means and the output of each of the at least one time delay means are connected to the data input of a corresponding sample and hold means, the clock signal inputs of the sample and hold means are each connected to the output of the second signal source means, and the outputs of the sample and hold means provide random values.

* * * * *